(12) United States Patent
Yukawa

(10) Patent No.: US 11,267,297 B2
(45) Date of Patent: Mar. 8, 2022

(54) SEALANT TIRE

(71) Applicant: SUMITOMO RUBBER INDUSTRIES, LTD., Kobe (JP)

(72) Inventor: Naoki Yukawa, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 312 days.

(21) Appl. No.: 15/111,546

(22) PCT Filed: Jan. 28, 2015

(86) PCT No.: PCT/JP2015/052367
§ 371 (c)(1),
(2) Date: Jul. 14, 2016

(87) PCT Pub. No.: WO2015/115486
PCT Pub. Date: Aug. 6, 2015

(65) Prior Publication Data
US 2016/0347127 A1    Dec. 1, 2016

(30) Foreign Application Priority Data

Jan. 30, 2014  (JP) .............................. JP2014-015966

(51) Int. Cl.
*B60C 19/00*      (2006.01)
*B60C 19/12*      (2006.01)
(Continued)

(52) U.S. Cl.
CPC ............ *B60C 19/002* (2013.01); *B29C 73/22* (2013.01); *B29D 30/0681* (2013.01);
(Continued)

(58) Field of Classification Search
CPC ..... B60C 19/002; B60C 19/12; B60C 19/122; B60C 19/125; B60C 1/00; B60C 17/06;
(Continued)

(56) References Cited

U.S. PATENT DOCUMENTS 2,012 A  *  3/1841  Burger ................... B27B 11/00
                                                    222/184
2,771,936 A  *  11/1956  Peterson ............ B29D 30/0685
                                                    156/115
(Continued)

FOREIGN PATENT DOCUMENTS

CN           1458881 A      11/2003
CN           1585702 A       2/2005
(Continued)

OTHER PUBLICATIONS

JXTG Nippon oils and Energy product details for polybutene as viewed at https://www.noe.jxtg-group.co.jp/english/products/chemical/n_polybutene.html ON Jul. 24, 2019 (Year: 2019).*

(Continued)

*Primary Examiner* — Jacob T Minskey
*Assistant Examiner* — Adrien J Bernard
(74) *Attorney, Agent, or Firm* — Birch, Stewart, Kolasch & Birch, LLP

(57) ABSTRACT

The present invention provides a sealant tire with excellent noise reducing properties and high productivity. The present invention relates to a sealant tire including a porous sound-absorbing material attached to the inner side of an innerliner through a sealant layer, the sealant layer containing 1 to 30 parts by weight of an inorganic filler per 100 parts by weight of butyl rubber.

18 Claims, 1 Drawing Sheet

(51) Int. Cl.
| | |
|---|---|
| B29D 30/06 | (2006.01) |
| B29C 73/22 | (2006.01) |
| C08K 3/013 | (2018.01) |
| C08L 9/00 | (2006.01) |
| C08L 91/00 | (2006.01) |
| C08K 3/04 | (2006.01) |
| C08L 23/22 | (2006.01) |

(52) U.S. Cl.
CPC ........ *B29D 30/0685* (2013.01); *B60C 19/122* (2013.01); *C08K 3/013* (2018.01); *C08K 3/04* (2013.01); *C08L 9/00* (2013.01); *C08L 23/22* (2013.01); *C08L 91/00* (2013.01); *B29D 2030/0682* (2013.01); *B29D 2030/0694* (2013.01); *B29K 2011/00* (2013.01)

(58) Field of Classification Search
CPC ..... B60C 17/066; B60C 19/00; B60C 29/062; B60C 5/002; B60C 5/14; B60C 5/142; B60C 7/105; B60C 7/12; B60C 9/12
See application file for complete search history.

(56) References Cited

U.S. PATENT DOCUMENTS

| | | | | |
|---|---|---|---|---|
| 3,803,274 | A * | 4/1974 | Nakashima | B29C 35/10 264/201 |
| 4,426,468 | A | 1/1984 | Ornum et al. | |
| 4,919,183 | A * | 4/1990 | Dobson | B29C 73/163 152/502 |
| 7,666,472 | B2 * | 2/2010 | Hirose | B29C 73/163 152/504 |
| 8,544,510 | B2 * | 10/2013 | Yukawa | B60C 19/002 152/155 |
| 2001/0006084 | A1 * | 7/2001 | Yukawa | B60C 19/00 152/450 |
| 2004/0140042 | A1 * | 7/2004 | Teratani | B60C 7/105 156/110.1 |
| 2004/0159386 | A1 * | 8/2004 | Deevers | B29C 73/163 152/503 |
| 2004/0256042 | A1 | 12/2004 | Naito et al. | |
| 2008/0099116 | A1 * | 5/2008 | Tanno | B60C 19/002 152/454 |
| 2009/0078353 | A1 * | 3/2009 | Majumdar | B29C 73/163 152/504 |
| 2009/0084482 | A1 * | 4/2009 | Majumdar | B29C 73/22 152/504 |
| 2010/0154959 | A1 * | 6/2010 | Majumdar | B29C 73/163 152/504 |
| 2010/0218883 | A1 * | 9/2010 | Naito | B29C 73/18 156/115 |
| 2010/0276049 | A1 * | 11/2010 | Yukawa | B60C 19/002 152/450 |
| 2010/0307655 | A1 * | 12/2010 | Tanno | B60C 19/002 152/504 |
| 2011/0308706 | A1 * | 12/2011 | Sandstrom | B29D 30/0061 156/123 |
| 2012/0210933 | A1 | 8/2012 | Naito | |
| 2013/0048180 | A1 * | 2/2013 | Song | B60C 19/002 152/450 |
| 2015/0000813 | A1 * | 1/2015 | Yoshimi | D02G 3/48 152/517 |
| 2015/0024196 | A1 | 1/2015 | Hayashi et al. | |
| 2015/0075691 | A1 * | 3/2015 | Merino Lopez | B60C 15/04 152/502 |

FOREIGN PATENT DOCUMENTS

| | | |
|---|---|---|
| CN | 101497716 A | 8/2009 |
| CN | 101778715 A | 7/2010 |
| CN | 101905633 A | 12/2010 |
| CN | 102950974 A | 3/2013 |
| CN | 104159990 A | 11/2014 |
| EP | 1 375 197 A1 | 1/2004 |
| EP | 1 577 123 A1 | 9/2005 |
| EP | 2 562 009 A2 | 2/2013 |
| JP | 57-158279 A | 9/1982 |
| JP | 2002-52911 A | 2/2002 |
| JP | 2002-332475 A | 11/2002 |
| JP | 2005-153871 A | 6/2005 |
| JP | 2006-152110 A | 6/2006 |
| JP | 2006-299277 A | 11/2006 |
| JP | 2007-99162 A | 4/2007 |
| JP | 2008162496 A * | 7/2008 |
| JP | 2009-28919 A | 2/2009 |
| JP | 2010-280340 A | 12/2010 |
| JP | 2011-20479 A | 2/2011 |
| JP | 2013-43643 A | 3/2013 |
| JP | 2013-112062 A | 6/2013 |
| WO | WO 03/101709 A1 | 12/2003 |
| WO | WO 2009/014082 A1 | 1/2009 |
| WO | WO 2009/096312 A1 | 8/2009 |
| WO | WO 2013/137072 A1 | 9/2013 |

OTHER PUBLICATIONS

International Search Report, issued in PCT/JP2015/052367, dated Apr. 14, 2015.
Written Opinion of the International Searching Authority, issued in PCT/JP2015/052367 (PCT/ISA 237), dated Apr. 14, 2015.
Notification of Reexamination dated Jan. 4, 2021, in Chinese Patent Application No. 201580004372.4.

* cited by examiner

SEALANT TIRE

TECHNICAL FIELD

The present invention relates to a sealant tire, and particularly to a sealant tire having noise reducing properties.

BACKGROUND ART

Tire cavity resonance, which is one source of road noise of vehicles, is resonance of the air inside the tire and thus lies in a low frequency range and can be very annoying in some vehicles. However, since it is resonance of the air inside the tire, such noise is very difficult to control by modifying vehicle bodies or tires. To solve this problem, for example, the following methods have been proposed and used in practice in which a sound-absorbing material is mounted inside a tire, or a Helmholtz type absorber is formed on or attached to a wheel. Further, the method of mounting a sound-absorbing material inside a tire may be carried out in practice by fixing a sound-absorbing material on the tread portion of a tire using an adhesive or fixing it using a resin belt.

In recent years, in addition to conventional run-flat tires and emergency puncture repair kits, sealant tires in which a puncture sealing layer is already placed inside the tire tread have been practically used as alternatives to spare tires carried on vehicles.

Moreover, various methods have been disclosed in which a sound-absorbing material and a sealant tire are combined to fix the sound-absorbing material inside the tire through a sealant layer (Patent Literature 1). However, these methods are all insufficient in terms of performance, processability, or other properties. Further, for practical use, the mass productivity needs to be improved.

CITATION LIST

Patent Literature

Patent Literature 1: JP 2011-20479 A

SUMMARY OF INVENTION

Technical Problem

The present invention aims to provide a sealant tire with excellent noise reducing properties and high productivity.

Solution to Problem

That is, the present invention relates to a sealant tire including a porous sound-absorbing material attached to the inner side of an innerliner through a sealant layer, the sealant layer containing 1 to 30 parts by weight of an inorganic filler per 100 parts by weight of butyl rubber.

The inorganic filler is preferably at least one selected from the group consisting of carbon black, silica, calcium carbonate, calcium silicate, magnesium oxide, aluminum oxide, barium sulfate, talc, and mica.

The porous sound-absorbing material preferably has a cross sectional area of 0.4% to 15% of a cross sectional area of a cavity of the tire mounted on a rim.

The porous sound-absorbing material preferably has a specific gravity of 0.005 to 0.06.

The porous sound-absorbing material is preferably a polyurethane sponge.

The porous sound-absorbing material preferably has a substantially constant width and a substantially constant cross-sectional shape.

The porous sound-absorbing material is preferably discontinuous.

The porous sound-absorbing material preferably has one discontinuity.

The discontinuous ends of the sponge are preferably overlapped.

The gap length between the discontinuous ends of the porous sound-absorbing material is preferably 80 mm or less.

Preferably, the porous sound-absorbing material has two discontinuities, and the ratio of the circumferential length of the shorter porous sound-absorbing material is 3% or less of the circumferential length of the longer porous sound-absorbing material.

The circumferential end face of the porous sound-absorbing material is preferably substantially perpendicular to the inner surface of a tread of the tire.

The circumferential end face of the porous sound-absorbing material preferably makes an angle of 10° to 80° with the inner surface of a tread of the tire.

Preferably, one or two taper angles relative to the inner surface of a tread of the tire are formed in the discontinuous end of the porous sound-absorbing material.

The difference in width between the porous sound-absorbing material and the sealant layer is preferably 1 to 40 mm.

The sealant layer preferably further contains, per 100 parts by weight of the butyl rubber, 100 to 400 parts by weight of polybutene and 1 to 10 parts by weight of a cross-linking agent.

The polybutene preferably has a number average molecular weight of 1,000 to 4,000.

The sealant layer preferably has a thickness of 1 to 4 mm.

The present invention also relates to a method for producing the above-described sealant tire, the method including:
a step of vulcanizing a tire;
a step of spirally extruding a sealant material;
a step of crosslinking; and
a step of attaching a porous sound-absorbing material.

Preferably, in the step of attaching a porous sound-absorbing material, a sponge of required size is mounted on a holder to attach the sponge to the tire.

Preferably, in the step of attaching a porous sound-absorbing material, a sound-absorbing material having a length in the tire circumferential direction which is required for processing two or more tires is loaded inside the tire and cut before attaching the sound-absorbing material.

Preferably, in the step of attaching a porous sound-absorbing material, a porous sound-absorbing material is continuously introduced and attached inside the tire through an opening of the tire to continuously attach the porous sound-absorbing material to the tire without changeover.

Preferably, the porous sound-absorbing material has been previously cut into a predetermined size in the tire width direction.

Advantageous Effects of Invention

The sealant tire provided by the present invention includes a porous sound-absorbing material attached to the inner side of an innerliner through a sealant layer, and the sealant layer contains 1 to 30 parts by weight of an inorganic filler per 100 parts by weight of butyl rubber. Therefore, the sealant tire has excellent noise reducing properties and high productivity.

DESCRIPTION OF EMBODIMENTS

Figure 1:
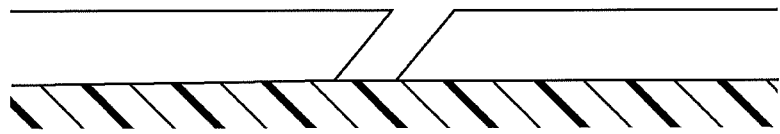
FIG. 1 illustrates tapered ends of a porous sound-absorbing material.

The sealant tire of the present invention is characterized by including a porous sound-absorbing material attached to the inner side of an innerliner through a sealant layer, the sealant layer containing 1 to 30 parts by weight of an inorganic filler per 100 parts by weight of butyl rubber. The sealant layer essentially contains butyl rubber, which is excellent in adhesive force, low air permeability, and weather resistance, and further contains an inorganic filler to improve kneadability.

The inorganic filler is not particularly limited, and is preferably at least one selected from the group consisting of carbon black, silica, calcium carbonate, calcium silicate, magnesium oxide, aluminum oxide, barium sulfate, talc, and mica. More preferred among these is carbon black which is usually used as filler for rubber components.

The amount of inorganic filler is 1 to 30 parts by mass, preferably 2 to 10 parts by mass per 100 parts by mass of butyl rubber. When the amount is less than 1 part by mass, the ingredients of the sealant cannot be kneaded. When the amount is more than 30 parts by mass, the sealant material is so hard that the air sealing performance is reduced.

The sealant layer preferably further contains polybutene. The amount of polybutene is preferably 100 to 400 parts by mass, more preferably 150 to 300 parts by mass per 100 parts by mass of butyl rubber. When the amount is less than 100 parts by mass, the sealant layer is so hard that the air sealing performance is reduced. When the amount is more than 400 parts by mass, the sealant layer is soft and can be flowable during use, thereby generating uneven vibration. The number average molecular weight of the polybutene is not particularly limited, and is preferably 1,000 to 4,000, more preferably 1,500 to 3,500. A polybutene with a number average molecular weight of less than 1,000 is difficult to knead with butyl rubber. When the number average molecular weight is more than 4,000, the adhesive force is reduced so that the air sealing performance tends to be insufficient. Herein, the number average molecular weight is determined by gel permeation chromatography (GPC) (GPC-8000 series available from Tosoh Corporation, detector: differential refractometer, column: TSKGEL SUPERMALTPORE HZ-M available from Tosoh Corporation) relative to polystyrene standards.

The sealant layer preferably further contains a cross-linking agent. Examples of the cross-linking agent include sulfur, peroxide activators (diaroyl peroxides, diacyl peroxides, peroxy esters), and quinonedioxime compounds. Preferred among these are peroxide activators and quinonedioxime compounds, with quinonedioxime compounds being more preferred, because they allow the effects of the present invention to be better achieved.

Examples of quinonedioxime compounds include p-quinonedioxime, p-quinonedioxime diacetate, p-quinonedioxime dicaproate, p-quinonedioxime dilaurate, p-quinonedioxime distearate, p-quinonedioxime dicrotonate, p-quinonedioxime dinaphthenate, p-quinonedioxime succinate, p-quinonedioxime adipate, p-quinonedioxime difuroate, p-quinonedioxime dibenzoate, p-quinonedioxime di (o-chlorobenzoate), p-quinonedioxime di (p-chlorobenzoate), p-quinonedioxime di(p-vitrobenzoate), p-quinonedioxime di(m-vitrobenzoate), p-quinonedioxime di(3,5-dinitrobenzoate), p-quinonedioxime di(p-methoxybenzoate), p-quinonedioxime di(n-amyloxybenzoate), and p-quinonedioxime di(m-bromobenzoate). Among these, p-benzoquinone dioxime is preferred in terms of adhesion, sealing performance, and fluidity.

The amount of cross-linking agent is preferably 1 to 10 parts by mass, more preferably 2 to 7 parts by mass per 100 parts by mass of butyl rubber. When the amount is less than 1 part by mass, the sealant layer is flowable, thereby causing difficulty in fixing the porous sound-absorbing material. When the amount is more than 10 parts by mass, the sealant layer is excessively hard, so that the sealing performance tends to be reduced.

The thickness of the sealant layer is not particularly limited, and is preferably 1 to 4 mm, more preferably 1.5 to 3.5 mm. A sealant layer with a thickness of less than 1 mm cannot repair punctures of the tire. Also, when the thickness is more than 4 mm, the sealing effect tends to be already saturated.

The porous sound-absorbing material preferably has a cross sectional area of 0.4% to 15%, more preferably 8% to 12% of the cross sectional area of the cavity of the tire mounted on a rim. The sound-absorbing properties of the porous sound-absorbing material do not depend on its thickness, but on its volume ratio to the cross sectional area of the cavity of the tire. When the cross sectional area is less than 0.4%, no sound-absorbing effect tends to be obtained. When the cross sectional area is more than 15%, the sound-absorbing properties tend not to be improved, i.e. already saturated.

The porous sound-absorbing material preferably has a specific gravity of 0.005 to 0.06, more preferably 0.02 to 0.05. A porous sound-absorbing material having a specific gravity of less than 0.005 or more than 0.06 tends to have poor sound-absorbing properties.

The porous sound-absorbing material may be made from any material, and suitable examples include synthetic resin sponges such as ether-based polyurethane sponges, ester-based polyurethane sponges, and polyethylene sponges; and rubber sponges such as chloroprene rubber sponges (CR sponges), ethylene propylene rubber sponges (EPDM sponges), and nitrile rubber sponges (NBR sponges). Among these, polyurethane-based sponges including ether-based polyurethane sponges or polyethylene-based sponges are preferred in terms of sound damping properties, light weight, controllability of foaming, durability, and other properties. More preferred are polyurethane sponges made from polyester-polyether copolymer polyols which are highly resistant to hydrolysis.

The porous sound-absorbing material preferably has a substantially constant width and a substantially constant cross-sectional shape, which indicate that the weight is constant in the circumferential direction, because this is advantageous in terms of prevention of vibration of tires, sponge formability, machining dimensions of the material, transportation, workability in production, and cost.

It is preferred for the porous sound-absorbing material to be continuous because the weight is constant in the circumferential direction of the tire. However, it is very costly to produce a continuous annular porous sound-absorbing material. In this regard, the cost and properties can be balanced by attaching a substantially rectangular porous sound-absorbing material so that the discontinuity between the ends of the material is reduced. The discontinuous ends of the sponge are preferably overlapped in order to prevent contaminants inside the tire from adhering to the sealant material. The porous sound-absorbing material preferably has one or two discontinuities although the number of discontinuities is not particularly limited. The gap length between the discontinuous ends (the space between the ends of the sponge or the overlap between the ends of the sponge) is preferably 80 mm or less, more preferably 20 mm or less. When the gap length is more than 80 mm, the balance tends to deteriorate. The gap length between the discontinuous ends is also preferably 1 mm or more in view of production cost. When the porous sound-absorbing material has two discontinuities, the ratio of the circumferential length of the shorter porous sound-absorbing material is preferably 3% or less, more preferably 1% or less of the circumferential length of the longer porous sound-absorbing material. A ratio of 3% or less corresponds to a small piece placed for filling the gap.

The circumferential end face of the porous sound-absorbing material is preferably substantially perpendicular to the inner surface of a tread of the tire because such a circumferential end face is readily prepared.

Figure 2:
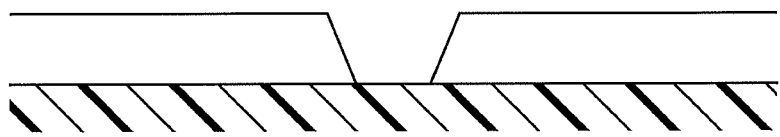
FIG. 2 illustrates another embodiment of tapered ends of a porous sound-absorbing material.
Figure 3:
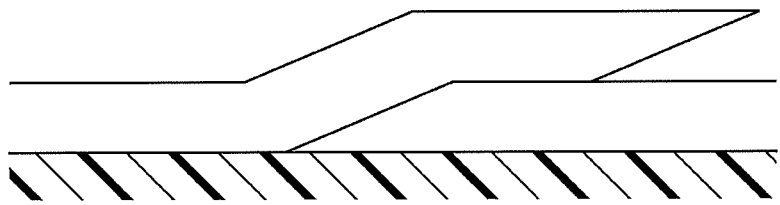
FIG. 3 illustrates tapered ends of a porous sound-absorbing material overlapping with each other.
Figure 4:
FIG. 4 illustrates an embodiment of truncated tapered ends of a porous sound-absorbing material.

Preferably, one or two taper angles relative to the inner surface of a tread of the tire are formed in the discontinuous end of the porous sound-absorbing material. The gap between the tapered ends of the sponge appears to be small, which prevents adhesion of contaminants. FIGS. 1 and 2 show embodiments of tapered ends. The ends tapered in the opposite directions as shown in FIG. 2 prevent the formation of cracks in the sponge at the bonding surface during use. FIG. 4 shows an embodiment of truncated tapered ends with two taper angles.

The circumferential end face (with a taper angle) of the porous sound-absorbing material preferably makes an angle of 10° to 80°, more preferably 15° to 45° with the inner surface of the tread of the tire. When the angle is less than 10°, such a circumferential end face is difficult to prepare. When the angle is more than 80°, the separation of the sponge tends to occur easily after long-term running, and the ends of the sponge, when intended to be overlapped, tend to be difficult to overlap with each other.

The width of the porous sound-absorbing material may be smaller or larger than the width of the sealant layer. Even when the width of the porous sound-absorbing material is larger than the width of the sealant layer, the effect of preventing the adhesion does not change. However, when the width of the porous sound-absorbing material is too much smaller, contaminants can readily adhere to a portion without the porous sound-absorbing material.

The difference (gap) in width between the porous sound-absorbing material and the sealant layer is preferably 0 to 40 mm, more preferably 1 to 40 mm, still more preferably 1 to 5 mm. When the difference is less than 1 mm, excessively high accuracy is required so that the porous sound-absorbing material is difficult to prepare. When the difference is more than 40 mm, the adhesion of contaminants to the sealant layer tends not to be prevented.

Moreover, the method for producing the sealant tire of the present invention is characterized by including: a step of vulcanizing a tire; a step of spirally extruding a sealant material; a step of crosslinking; and a step of attaching a porous sound-absorbing material. The sealant material is preferably spirally extruded so that the sealant material is uniformly formed. Thereafter, the sealant material is subjected to the crosslinking step to impart fluidity resistance, and then the porous sound-absorbing material is attached through the sealant material.

In the step of attaching a porous sound-absorbing material, a sponge of required size is preferably mounted on a holder to attach the sponge to the tire.

In the step of attaching a porous sound-absorbing material, preferably, a sound-absorbing material having a length in the tire circumferential direction which is required for processing two or more tires is loaded inside the tire and cut before attaching the sound-absorbing material, because this reduces the number of changeovers of the sound-absorbing material, and is also effective in producing mixed models of tires with different sizes.

In the step of attaching a porous sound-absorbing material, preferably, in view of productivity, a porous sound-absorbing material is continuously introduced and attached inside the tire through an opening of the tire to continuously attach the porous sound-absorbing material to the tire without changeover.

Preferably, the porous sound-absorbing material has been previously cut into a predetermined size in the tire width direction.

EXAMPLES

The present invention is specifically described with reference to, but not limited to, examples.

The chemicals used in examples and comparative examples are listed below.

Butyl rubber: IIR11065 available from JSR Corporation

Polybutene: HV-1900 (number average molecular weight: 2,900) available from JX Nippon Oil & Energy Corporation Carbon black: N330 available from Cabot Japan K.K.

Oil: DOS (dioctylsebacate) available from Taoka Chemical Co., Ltd.

Cross-linking agent 1: QDO (p-benzoquinone dioxime) available from Ouchi Shinko Chemical Industrial Co., Ltd.

Stearic acid: Stearic acid beads "TSUBAKI" available from NOF Corporation

Zinc oxide: Zinc oxide #2 available from Mitsui Mining and Smelting Co., Ltd.

Vulcanizing agent 2: Sulfur powder available from Tsurumi Chemical Industry Co., Ltd.

Accelerator: Zinc dibenzyldithiocarbamate, Curekind ZBEC, available from Ningbo Actimix Polymer Sponge: ESH2 (made of polyurethane, width 200 mm, thickness 10 mm, specific gravity 0.039) available from Inoac Corporation Examples 1 to 3, and 33 and Comparative Examples 1 and 2

The materials in the formulation amounts shown in Table 1 were kneaded using a twin-screw extruder at 110° C. to prepare a kneaded mixture. The kneadability was evaluated according to the following criteria. Table 1 shows the results.

<Kneading Difficulty>

Excellent: Well kneadable

Good: Kneadable

Acceptable: Difficult but kneadable

Poor: Unkneadable

<Air Leakage>

A sealant material was spirally extruded and applied to the inside of a tire (235/45R17, 94W, rim: 17×8J, cross sectional area of cavity of rim-mounted tire: 187 cm$^2$) to have a thickness of 3 mm and a width of 190 mm. A sponge with a length of 1,900 mm and a thickness of 10 mm was placed so that the gap between the ends of the sponge was 25 mm. Ten round nails (shank diameter: 4.2 mm) according to JIS N100 were completely driven into a longitudinal groove of the tire with an initial internal pressure of 230 kPa at an ambient temperature of 25° C., and immediately thereafter the nails were removed. The tire was then allowed to stand for one day, and the internal pressure of the resulting tire was measured. The decrease in internal pressure was taken as the air leakage and expressed as an index, with Example 1 set equal to 20. A higher index indicates a larger amount of air leakage.

<Fluidity>

After the sealant material was attached to the tire, the sealant material was crosslinked in an oven at 170° C. for 10 minutes. After that, the tire alone was allowed to stand vertically at 60° C. for 24 hours, and the sealant material was visually observed to determine whether the sealant material flowed down or not by gravity. The results were evaluated based on the following criteria.

Good: The sealant material did not flow.
Acceptable: The sealant material flowed slightly.
Poor: The sealant material flowed.

TABLE 1

|  |  | Example No. | | | | | |
| --- | --- | --- | --- | --- | --- | --- | --- |
|  |  | Example 1 | Comparative Example 1 | Example 2 | Example 3 | Comparative Example 2 | Example 33 |
| Formulation (parts by mass) | Butyl rubber | 100 | 100 | 100 | 100 | 100 | 100 |
|  | Polybutene | 200 | 200 | 200 | 200 | 200 | 200 |
|  | Carbon black | 10 | — | 1 | 30 | 50 | 10 |
|  | Oil | 15 | 15 | 15 | 15 | 15 | 15 |
|  | Cross-linking agent 1 | 7 | 7 | 7 | 7 | 7 | — |
|  | Stearic acid | — | — | — | — | — | 1 |
|  | Zinc oxide | — | — | — | — | — | 5 |
|  | Cross-linking agent 2 | — | — | — | — | — | 5 |
|  | Accelerator | — | — | — | — | — | 2 |
| Sealant layer | Average thickness of applied layer (mm) | 3 | — | 3 | 3 | 3 | 3 |
|  | Width of applied layer (mm) | 190 | 190 | 190 | 190 | 190 | 190 |
| Porous sound-absorbing material | Sponge width (mm) | 200 | 200 | 200 | 200 | 200 | 200 |
|  | Sponge thickness (mm) | 10 | 10 | 10 | 10 | 10 | 10 |
| Evaluation | Kneading difficulty | Good | Poor | Acceptable | Excellent | Excellent | Good |
|  | Air leakage | 20 | — | 20 | 200 | 600 | 200 |
|  | Fluidity | Good | — | Good | Good | Good | Good |

Examples 4 to 12

As shown in Table 2, the sealant material used in Example 1 was spirally extruded and applied to the inside of a tire to have a thickness of 3 mm and a width of 190 mm. The sealant material was heated by hot air at 140° C. for 10 minutes to cause crosslinking. A sponge having the configuration shown in Table 2 was placed as a porous sound-absorbing material on the sealant material. The following evaluations were performed. Table 2 shows the results.

<The Number of Pieces of Paper Adhered>

In a tire not mounted on a rim were scattered 160 pieces of 20 mm square copy paper, and the paper pieces were taken out from the tire laid on its side. Then, the number of paper pieces left inside the tire was counted. A larger number of paper pieces indicates that contaminants are more likely to be trapped in the tire.

<Production Index>

The time taken to attach the sponge manually was expressed as a production index, with Example 5 set equal to 100. A higher production index indicates a worse result. With respect to the gap values, an error of ±3 mm is acceptable.

TABLE 2

|  |  | Example No. | | | | | | | | |
| --- | --- | --- | --- | --- | --- | --- | --- | --- | --- | --- |
|  |  | Example 4 | Example 5 | Example 6 | Example 7 | Example 8 | Example 9 | Example 10 | Example 11 | Example 12 |
| Sealant material | Type | Example 1 | Example 1 | Example 1 | Example 1 | Example 1 | Example 1 | Example 1 | Example 1 | Example 1 |
|  | Thickness (mm) | 3 | 3 | 3 | 3 | 3 | 3 | 3 | 3 | 3 |
|  | Width (mm) | 190 | 190 | 190 | 190 | 190 | 190 | 190 | 190 | 190 |

TABLE 2-continued

|  |  | Example 4 | Example 5 | Example 6 | Example 7 | Example 8 | Example 9 | Example 10 | Example 11 | Example 12 |
|---|---|---|---|---|---|---|---|---|---|---|
| Sponge | Thickness (mm) | 10 | 10 | 10 | 10 | 10 | 10 | 10 | 10 | 10 |
|  | Width (mm) | 190 | 180 | 170 | 160 | 150 | 150 | 100 | 230 | 250 |
|  | Ratio of cross sectional area to cavity area (%) | 10.2 | 9.6 | 9.1 | 8.6 | 8.0 | 8.0 | 5.3 | 12.3 | 13.4 |
|  | Gap (mm) on stencil side | 0 | 5 | 10 | 15 | 20 | 0 | 45 | 20 | 30 |
|  | Gap (mm) on side opposite to stencil side | 0 | 5 | 10 | 15 | 20 | 40 | 45 | 20 | 30 |
| Evaluation | Number of pieces of paper adhered | 1 | 4 | 6 | 9 | 16 | 20 | 43 | 0 | 0 |
|  | Production index | 500 | 100 | 100 | 100 | 100 | 130 | 100 | 100 | 100 |

Examples 1 and 13 to 18

The materials in the formulation amounts shown in Table 3 were kneaded using a twin-screw extruder at 110° C. to prepare a kneaded mixture. Kneading difficulty, air leakage, and fluidity were evaluated by the above-described methods. Table 3 shows the results.

TABLE 3

|  |  | Example 1 | Example 13 | Example 14 | Example 15 | Example 16 | Example 17 | Example 18 |
|---|---|---|---|---|---|---|---|---|
| Formulation (parts by mass) | Butyl rubber | 100 | 100 | 100 | 100 | 100 | 100 | 100 |
|  | Polybutene | 200 | 100 | 400 | 50 | 100 | 400 | 500 |
|  | Carbon black | 10 | 10 | 10 | 10 | 10 | 10 | 10 |
|  | Oil | 15 | 15 | 15 | 15 | 15 | 15 | 15 |
|  | Cross-linking agent 1 | 7 | 10 | 1 | 7 | 7 | 7 | 7 |
| Sealant layer | Average thickness of applied layer | 3 | 3 | 3 | 3 | 3 | 3 | 3 |
|  | Width of applied layer (mm) | 190 | 190 | 190 | 190 | 190 | 190 | 190 |
| Porous sound-absorbing material | Sponge width (mm) | 200 | 200 | 200 | 200 | 200 | 200 | 200 |
|  | Sponge thickness (mm) | 10 | 10 | 10 | 10 | 10 | 10 | 10 |
| Evaluation | Kneading difficulty | Good | Good | Good | Good | Good | Good | Good |
|  | Air leakage | 20 | 180 | 20 | 200 | 100 | 20 | 10 |
|  | Fluidity | Good | Good | Acceptable | Good | Good | Good | Poor |

Examples 1 and 19 to 23

The materials in the formulation amounts shown in Table 4 were kneaded using a twin-screw extruder at 110° C. to prepare a kneaded mixture. Kneading difficulty, air leakage, and fluidity were evaluated by the above-described methods. Table 4 shows the results.

TABLE 4

|  |  | Example 1 | Example 19 | Example 20 | Example 21 | Example 22 | Example 23 |
|---|---|---|---|---|---|---|---|
| Formulation (parts by mass) | Butyl rubber | 100 | 100 | 100 | 100 | 100 | 100 |
|  | Polybutene | 200 | 100 | 400 | 50 | 100 | 400 |
|  | Carbon black | 10 | 10 | 10 | 10 | 10 | 10 |
|  | Oil | 15 | 15 | 15 | 15 | 15 | 15 |
|  | Cross-linking agent 1 | 7 | 0 | 1 | 5 | 10 | 15 |
| Sealant layer | Average thickness of applied layer | 3 | 3 | 3 | 3 | 3 | 3 |
|  | Width of applied layer (mm) | 190 | 190 | 190 | 190 | 190 | 190 |
| Porous sound-absorbing material | Sponge width (mm) | 200 | 200 | 200 | 200 | 200 | 200 |
|  | Sponge thickness (mm) | 10 | 10 | 10 | 10 | 10 | 10 |
| Evaluation | Kneading difficulty | Good | Good | Good | Good | Good | Good |
|  | Air leakage | 20 | 10 | 10 | 20 | 100 | 700 |
|  | Fluidity | Good | Poor | Acceptable | Good | Good | Good |

Examples 1, 24, and 25

The materials in the formulation amounts shown in Table 5 were kneaded using a twin-screw extruder at 110° C. for 3 minutes to prepare a kneaded mixture. Kneading difficulty, air leakage, and fluidity were evaluated by the above-described methods. Table 5 shows the results.

TABLE 5

|  |  |  | Example No. | | |
| --- | --- | --- | --- | --- | --- |
|  |  |  | Example 1 | Example 24 | Example 25 |
| Formulation (parts by mass) | Butyl rubber |  | 100 | 100 | 100 |
|  | Polybutene | Amount | 200 | 200 | 200 |
|  |  | Molecular weight | 2900 | 1000 | 4000 |
|  | Carbon black |  | 10 | 10 | 10 |
|  | Oil |  | 15 | 15 | 15 |
|  | Cross-linking agent 1 |  | 7 | 7 | 7 |
| Average thickness of applied layer (mm) |  |  | 3 | 3 | 3 |
| Evaluation | Kneading difficulty |  | Good | Good | Good |
|  | Air leakage |  | 20 | 10 | 10 |
|  | Fluidity |  | Good | Acceptable | Good |

Examples 4 and 26 to 29

As shown in Table 6, the sealant material used in Example 1 was spirally extruded and applied to the inside of a tire to have a width of 190 mm, but the thickness of the sealant material was varied. The sealant material was heated by hot air at 140° C. for 10 minutes to cause crosslinking. A sponge having the configuration shown in Table 6 was placed as a porous sound-absorbing material on the sealant material. Air leakage and fluidity were evaluated by the above-described methods, and the cost of the sealant material was also calculated. Table 6 shows the results.

TABLE 6

|  |  | Example No. | | | | |
| --- | --- | --- | --- | --- | --- | --- |
|  |  | Example 4 | Example 26 | Example 27 | Example 28 | Example 29 |
| Sealant material | Type | Example 1 | Example 1 | Example 1 | Example 1 | Example 1 |
|  | Thickness (mm) | 3 | 0.5 | 1 | 4 | 6 |
|  | Width (mm) | 190 | 190 | 190 | 190 | 190 |
| Sponge | Thickness (mm) | 10 | 10 | 10 | 10 | 10 |
|  | Width (mm) | 200 | 200 | 200 | 200 | 200 |
| Evaluation | Air leakage | 20 | 200 | 150 | 17 | 17 |
|  | Fluidity | Good | Good | Good | Good | Good |
|  | Cost of sealant material | 100 | 17 | 33 | 133 | 200 |

Examples 30 to 32

Sealant tires were prepared using the sealant materials and sponges shown in Table 7 by the production methods described below. The time taken to attach the sponge in each production method was measured. Table 7 shows the results.

Production method 1: A porous sound-absorbing material that had been previously cut into a predetermined size in the tire width direction was used.

Production method 2: A sound-absorbing material having a length in the tire circumferential direction which was required for processing two or more tires was loaded inside a tire and cut before attaching the sound-absorbing material.

Production method 3: A porous sound-absorbing material was continuously introduced and attached inside a tire through an opening of the tire to continuously attach the porous sound-absorbing material to the tire without change-over.

TABLE 7

|  |  | Example No. | | |
| --- | --- | --- | --- | --- |
|  |  | Example 30 | Example 31 | Example 32 |
| Sealant material | Type | Example 1 | Example 1 | Example 1 |
|  | Thickness (mm) | 3 | 3 | 3 |
|  | Width (mm) | 190 | 190 | 190 |

TABLE 7-continued

|  |  | Example No. | | |
| --- | --- | --- | --- | --- |
|  |  | Example 30 | Example 31 | Example 32 |
| Sponge | Thickness (mm) | 10 | 10 | 10 |
|  | Width (mm) | 200 | 200 | 200 |
|  | Length of material (mm) | 1900 | 4000 | 20000 |
| Method |  | Production method 1 | Production method 2 | Production method 3 |
| Time taken to attach sponge |  | 200 | 170 | 100 |

Examples 5 and 34 to 36

As shown in Table 8, the sealant material used in Example 1 was spirally extruded and applied to the inside of a tire (235/45R17, 94W, rim: 17×8J) to have a thickness of 3 mm and a width of 190 mm. The sealant material was heated by hot air at 140° C. for 10 minutes to cause crosslinking. A sponge having the configuration shown in Table 8 was placed as a porous sound-absorbing material on the sealant material. The number of pieces of paper adhered and the production index were determined by the above-described methods. In addition, the evaluations described below were performed. Table 8 shows the results.

In Table 8, positive values of the "gap length between discontinuous ends" indicate lengths of overlap, while negative values of the "gap length between discontinuous ends" indicate lengths of the gap between the ends of the sponge.

In the examples in Table 8, the number of discontinuities is one.

<Index of Tire Uniformity>

RFV was measured under the conditions below in accordance with the uniformity test procedures according to JASO C607:2000. The RFV values are expressed as an index, with Example 34 set equal to 100. A higher index indicates poorer tire balance.
Rim: 17×8J
Internal pressure: 200 kPa
Load: 4.6 kN
Speed: 120 km/h Examples 5 and 37 to 39

As shown in Table 9, the sealant material used in Example 1 was spirally extruded and applied to the inside of a tire (235/45R17, 94W, rim: 17×8J) to have a thickness of 3 mm and a width of 190 mm. The sealant material was heated by hot air at 140° C. for 10 minutes to cause crosslinking. A sponge having the configuration shown in Table 9 was placed as a porous sound-absorbing material on the sealant material. The evaluations described below were performed. Table 9 shows the results.

In Table 9, positive values of the "gap length between discontinuous ends" indicate lengths of overlap, while negative values of the "gap length between discontinuous ends" indicate lengths of the gap between the ends of the sponge.

In the examples shown in Table 9, ends tapered in the opposite directions as shown in FIG. 2 were formed.

<Separation after Running>

The tires were mounted on a car and the car was run 40,000 km at a speed of 80 km/h and a load of 5.0 kN. After running, the tires were examined for separation of the longitudinal end of the sponge.

TABLE 8

|  |  | Example No. | | | |
| --- | --- | --- | --- | --- | --- |
|  |  | Example 5 | Example 34 | Example 35 | Example 36 |
| Sealant material | Type | Example 1 | Example 1 | Example 1 | Example 1 |
|  | Thickness (mm) | 3 | 3 | 3 | 3 |
|  | Width (mm) | 190 | 190 | 190 | 190 |
| Sponge | Thickness (mm) | 10 | 10 | 10 | 10 |
|  | Width (mm) | 180 | 180 | 180 | 180 |
|  | Gap (mm) on stencil side | 5 | 5 | 5 | 5 |
|  | Gap (mm) on side opposite to stencil side | 5 | 5 | 5 | 5 |
|  | Gap length between discontinuous ends (mm) | −10 | 0 | 80 | 200 |
| Evaluation | Number of pieces of paper adhered | 4 | 4 | 4 | 4 |
|  | Production index | 100 | 200 | 100 | 100 |
|  | Index of tire uniformity | 100 | 100 | 102 | 110 |

TABLE 9

| | | Example No. | | | |
|---|---|---|---|---|---|
| | | Example 5 | Example 37 | Example 38 | Example 39 |
| Sealant material | Type | Example 1 | Example 1 | Example 1 | Example 1 |
| | Thickness (mm) | 3 | 3 | 3 | 3 |
| | Width (mm) | 190 | 190 | 190 | 190 |
| Sponge | Thickness (mm) | 10 | 10 | 10 | 10 |
| | Width (mm) | 180 | 180 | 180 | 180 |
| | Gap length between discontinuous ends (mm) | −10 | −10 | −10 | −10 |
| | Taper angle (°) | 80 | 145 | 45 | 10 |
| Evaluation | Separation after running | No separation | Separated | No separation | No separation |

The invention claimed is:

1. A sealant tire, comprising a porous sound-absorbing material attached to the inner side of an innerliner through a sealant layer, the sealant layer comprising 1 to less than 10 parts by weight of an inorganic filler per 100 parts by weight of butyl rubber,
and the sealant layer further comprising polybutene and a quinonedioxime compound, wherein the polybutene has an average molecular weight of 1,000 to 4,000,
wherein the difference in width between the porous sound-absorbing material and the sealant layer is 1 to 40 mm.

2. The sealant tire according to claim 1,
wherein the inorganic filler is at least one selected from the group consisting of carbon black, silica, calcium carbonate, calcium silicate, magnesium oxide, aluminum oxide, barium sulfate, talc, and mica.

3. The sealant tire according to claim 1,
wherein the porous sound-absorbing material has a cross sectional area of 0.4% to 15% of a cross sectional area of a cavity of the tire mounted on a rim.

4. The sealant tire according to claim 1,
wherein the porous sound-absorbing material has a specific gravity of 0.005 to 0.06.

5. The sealant tire according to claim 1,
wherein the porous sound-absorbing material is a polyurethane sponge.

6. The sealant tire according to claim 1,
wherein the porous sound-absorbing material has a substantially constant width and a substantially constant cross-sectional shape.

7. The sealant tire according to claim 1,
wherein the porous sound-absorbing material is discontinuous.

8. The sealant tire according to claim 7,
wherein the porous sound-absorbing material has one discontinuity.

9. The sealant tire according to claim 7,
wherein the discontinuous ends of the porous sound-absorbing material are overlapped.

10. The sealant tire according to claim 7,
wherein the gap length between the discontinuous ends of the porous sound-absorbing material is 80 mm or less.

11. The sealant tire according to claim 7,
wherein the porous sound-absorbing material has two discontinuities and comprises a shorter porous sound-absorbing material and a longer porous sound-absorbing material, and the ratio of the circumferential length of the shorter porous sound-absorbing material is 3% or less of the circumferential length of the longer porous sound-absorbing material.

12. The sealant tire according to claim 1,
wherein the circumferential end face of the porous sound-absorbing material is substantially perpendicular to the inner surface of a tread of the tire.

13. The sealant tire according to claim 1,
wherein the circumferential end face of the porous sound-absorbing material makes an angle of 10° to 80° with the inner surface of a tread of the tire.

14. The sealant tire according to claim 1,
wherein one or two taper angles of the circumferential end face of the porous sound-absorbing material relative to the inner surface of a tread of the tire are formed in the discontinuous end of the porous sound-absorbing material.

15. The sealant tire according to claim 1,
wherein the sealant layer comprises, per 100 parts by weight of the butyl rubber, 100 to 400 parts by weight of the polybutene and 1 to 10 parts by weight of a cross-linking agent.

16. The sealant tire according to claim 1,
wherein the polybutene has a number average molecular weight of 1,500 to 3,500.

17. The sealant tire according to claim 1,
wherein the sealant layer has a thickness of 1 to 4 mm.

18. A sealant tire, comprising:
a porous sound-absorbing material attached to the inner side of an innerliner through a sealant layer, the sealant layer comprising 1 to less than 10 parts by weight of an inorganic filler per 100 parts by weight of butyl rubber, and the sealant layer further comprises, per 100 parts by weight of the butyl rubber, 100 to 400 parts by weight of polybutene and 1 to 10 parts by weight of a cross-linking agent, wherein the cross-linking agent is a quinonedioxime compound;
wherein the inorganic filler is at least one selected from the group consisting of carbon black, silica, calcium carbonate, calcium silicate, magnesium oxide, aluminum oxide, barium sulfate, talc, and mica;
wherein the porous sound-absorbing material has a cross sectional area of 0.4% to 15% of a cross sectional area of a cavity of the tire mounted on a rim; and
wherein the difference in width between the porous sound-absorbing material and the sealant layer is 1 to 40 mm.

* * * * *